United States Patent
Kothari (10) Patent No.: US 8,923,647 B2
(45) Date of Patent: Dec. 30, 2014

(54) PROVIDING PRIVACY IN A SOCIAL NETWORK SYSTEM

(71) Applicant: Google Inc., Mountain View, CA (US)

(72) Inventor: Devesh Kothari, Zurich (CH)

(73) Assignee: Google, Inc., Mountain View, CA (US)

( * ) Notice: Subject to any disclaimer, the term of this patent is extended or adjusted under 35 U.S.C. 154(b) by 106 days.

(21) Appl. No.: 13/626,754

(22) Filed: Sep. 25, 2012

(65) Prior Publication Data

US 2014/0086493 A1 Mar. 27, 2014

(51) Int. Cl.
*G06K 9/20* (2006.01)
*G06K 9/00* (2006.01)
*G06K 9/18* (2006.01)

(52) U.S. Cl.
USPC ............ 382/283; 382/118; 382/185; 382/187

(58) Field of Classification Search
None
See application file for complete search history.

(56) References Cited

U.S. PATENT DOCUMENTS

| | | |
|---|---|---|
| 2008/0044064 A1 | 2/2008 | His |
| 2009/0010570 A1 | 1/2009 | Yamada |
| 2009/0216769 A1* | 8/2009 | Bellwood et al. ............... 707/9 |
| 2011/0169932 A1 | 7/2011 | Mula |
| 2011/0202968 A1 | 8/2011 | Nurmi |
| 2011/0246895 A1 | 10/2011 | Roulliere |
| 2012/0250951 A1* | 10/2012 | Chen ............................. 382/118 |
| 2013/0182007 A1* | 7/2013 | Syeda-Mahmood et al. . 345/629 |

OTHER PUBLICATIONS

Defaux et al, JPSEC for Secure Imaging in JPEG 2000, Signal Processing Institute, Swiss Federal Institute of Technology, 1015, Lausanne, Switzerland.
International Search Report and Written Opinion, dated Jan. 7, 2014, for related PCT Application No. PCT/US2013/061504.
Cutillo et al., "Privacy Preserving picture sharing: enforcing usage control in distributed on-line social networks", Proceedings of the Fifth Workshop on Social Network Systems, Apr. 10, 2012.
Burghardt et al., "PRIMO—Towards Privacy Aware Image Sharing", Web Intelligence and Intelligent Agent Technology, Dec. 9, 2008.
Cutillo et al., "Safebook: A Privacy-Preserving online social network leveraging real-life trust", IEEE Communications Magazine, Dec. 1, 2009.

* cited by examiner

*Primary Examiner* — Bhavesh Mehta
*Assistant Examiner* — David F Dunphy
(74) *Attorney, Agent, or Firm* — IP Spring (57) ABSTRACT

Embodiments generally relate to providing privacy in a social network system. In some embodiments, a method includes recognizing one or more objects in at least one photo. The method also includes determining one or more objects to be obscured in the at least one photo based on one or more user preferences. The method also includes causing the at least one photo to be displayed such that the determined one or more objects are obscured.

20 Claims, 7 Drawing Sheets

PROVIDING PRIVACY IN A SOCIAL NETWORK SYSTEM

TECHNICAL FIELD

Embodiments relate generally to social networks, and more particularly to providing privacy in a social network system.

BACKGROUND

Digital cameras have made taking photos very easy, and social network systems have made sharing photos very easy. Some applications enable a user to instantly upload photos to a social network system, and many social network systems enable the user to send photos to social network contacts (e.g., friends) of the user. Recipient users may then share a given photo with other users of the social network system.

SUMMARY

Embodiments generally relate to providing privacy in a social network system. In some embodiments, a method includes recognizing one or more objects in at least one photo. The method also includes determining one or more objects to be obscured in the at least one photo based on one or more user preferences. The method also includes causing the at least one photo to be displayed such that the determined one or more objects are obscured.

With further regard to the method, at least one object of the one or more objects is a face. In some embodiments, at least one object of the one or more objects includes text. In some embodiments, at least one object of the one or more objects includes a logo. In some embodiments, the recognizing is performed using one or more recognition algorithms. In some embodiments, the one or more user preferences includes an indication of which objects to obscure. In some embodiments, the determining of one or more objects to be obscured includes receiving one or more user preferences associated with the at least one photo, and where the one or more user preferences includes an indication of which objects to obscure. In some embodiments, the one or more user preferences includes an indication of which objects to display unobscured. In some embodiments, one or more objects in the at least one photo are obscured by default, and where one or more objects are selectively unobscured based on one or more user preferences. In some embodiments, one or more objects in the at least one photo are unobscured by default, and where one or more objects are selectively obscured based on one or more user preferences.

In some embodiments, a method includes recognizing one or more objects in at least one photo, where the one or more objects include one or more of at least one face, text, and at least one logo, and where the recognizing is performed using one or more recognition algorithms. The method further includes determining one or more objects to be obscured in the at least one photo based on one or more user preferences, where the determining of one or more objects to be obscured includes receiving one or more user preferences associated with the at least one photo, and where the one or more user preferences includes an indication of which objects to obscure. The method further includes causing the at least one photo to be displayed such that the determined one or more objects are obscured, where one or more objects in the at least one photo are obscured by default, and where one or more objects are selectively unobscured based on one or more user preferences.

In some embodiments, a system includes one or more processors, and logic encoded in one or more tangible media for execution by the one or more processors. When executed, the logic is operable to perform operations including: recognizing one or more objects in at least one photo; determining one or more objects to be obscured in the at least one photo based on one or more user preferences; and causing the at least one photo to be displayed such that the determined one or more objects are obscured.

With further regard to the system, at least one object of the one or more objects is a face. In some embodiments, at least one object of the one or more objects includes text. In some embodiments, at least one object of the one or more objects includes a logo. In some embodiments, the recognizing is performed using one or more recognition algorithms. In some embodiments, the one or more user preferences includes an indication of which objects to obscure. In some embodiments, to determine one or more objects to be obscured, the logic when executed is further operable to perform operations including receiving one or more user preferences associated with the at least one photo, and where the one or more user preferences includes an indication of which objects to obscure. In some embodiments, the one or more user preferences includes an indication of which objects to display unobscured.

DETAILED DESCRIPTION

A method for providing privacy in photos in a social network system is described. In some embodiments, the system recognizes one or more objects in at least one photo. The one or more objects may include, for example, one or more faces, text, one or more logos, etc. In various embodiments, the system recognizes objects using one or more recognition algorithms.

The system then determines one or more objects to be obscured in the photo. In some embodiments, the system may determine one or more objects to be obscured by receiving one or more user preferences associated with the photo. The user preferences may include an indication of which objects to obscure and/or which objects to display unobscured.

The system then causes the photo to be displayed such that the determined one or more objects are obscured. In some embodiments, the system may obscure one or more objects in the photo by default, where one or more objects are selectively unobscured based on one or more user preferences. In some embodiments, the system may display one or more objects in the photo unobscured by default, where one or more objects are selectively obscured based on one or more user preferences.

Figure 1:
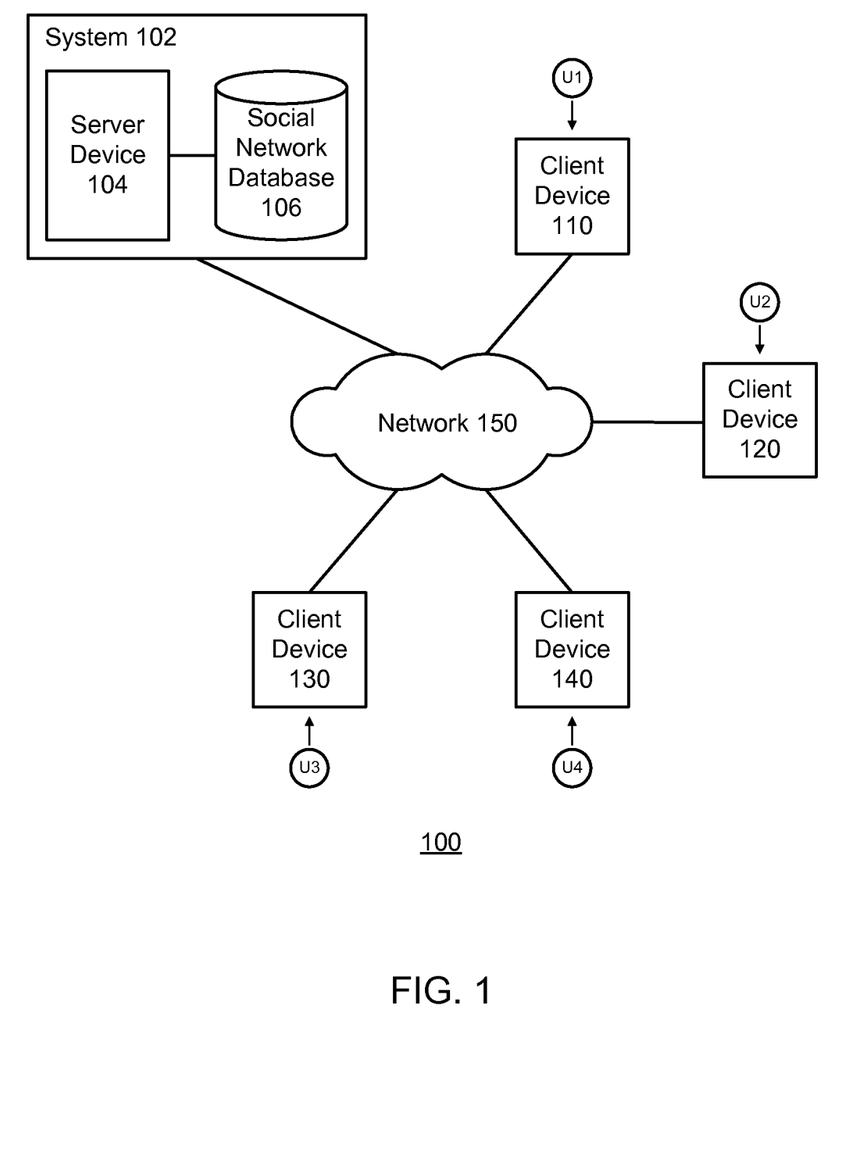
FIG. 1 illustrates a block diagram of an example network environment, which may be used to implement the embodiments described herein.

FIG. 1 illustrates a block diagram of an example network environment 100, which may be used to implement the embodiments described herein. In some embodiments, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

In various embodiments, users U1, U2, U3, and U4 may communicate with each other using respective client devices 110, 120, 130, and 140. For example, users U1, U2, U3, and U4 may interact with each other, where respective client devices 110, 120, 130, and 140 transmit media content such as photos to each other.

Figure 2:
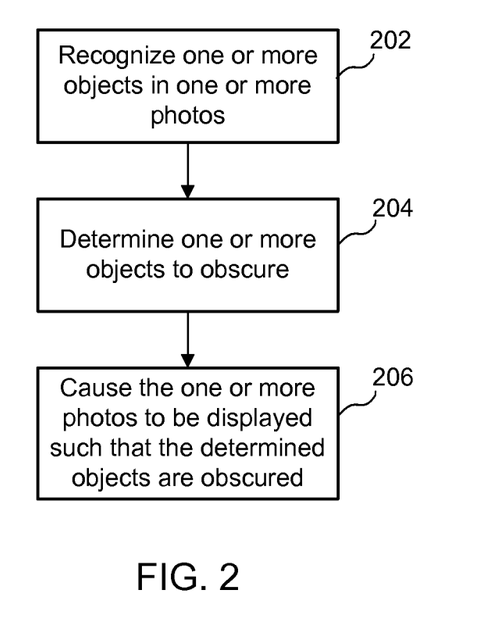
FIG. 2 illustrates an example simplified flow diagram for providing privacy in a social network system, according to some embodiments.

FIG. 2 illustrates an example simplified flow diagram for providing privacy in a social network system, according to some embodiments. Referring to FIGS. 1 and 2, a method is initiated in block 202, where system 102 recognizes one or more objects in one or more photos. In some embodiments, the one or more objects may include faces, text, logos, landmarks, etc.

Figure 3:
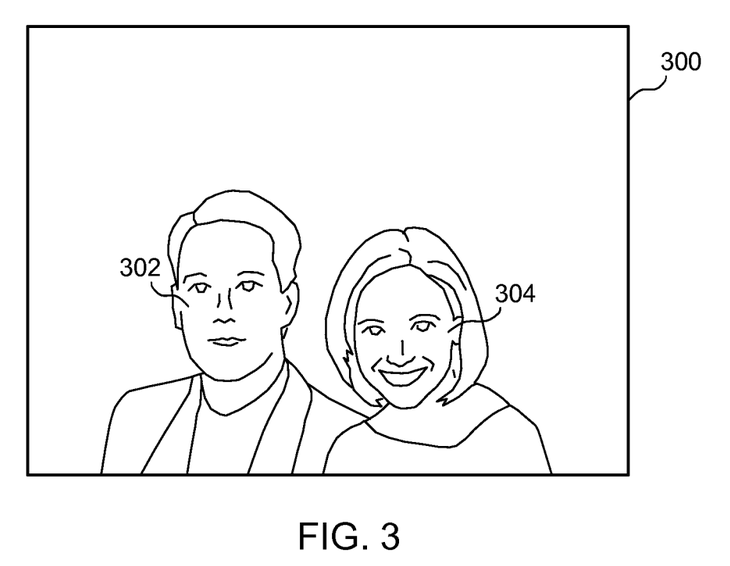
FIG. 3 illustrates an example simplified diagram of a photo.

FIG. 3 illustrates an example simplified diagram of a photo 300. In this example, photo 300 includes faces 302 and 304 of two people. For ease of illustration, the objects shown in photo 300 are faces 302 and 304. In other photos, as indicated above, objects shown in a given photo may include faces, text, logos, landmarks, etc.

In various embodiments, system 102 may utilize a variety of recognition algorithms to recognize objects in photos. Such recognition algorithms may be integral to system 102. System 102 may also access recognition algorithms provided by software that is external to system 102 and that system 102 accesses. Such recognition algorithms may include facial recognition algorithms, pattern recognition algorithms, etc.

As described in more detail below, in various embodiments, system 102 enables users of the social network system to specify and/or consent to the use of personal information, which may include system 102 using their faces in photos or using their identity information in recognizing people identified in photos.

Referring again to FIG. 2, in block 204, system 102 determines one or more objects to obscure in one or more photos based on one or more user preferences. For example, a user might want particular information in a photo to be unavailable to the public. Such information may include, for example, identifiable faces in the photo, associations with people in the photo, objects in the photo, etc.

In some embodiments, to determine which one or more objects to obscure, system 102 may receive, from the user, one or more user preferences associated with one or more photos. The one or more user preferences may include an indication of which objects to obscure. For example, the user may indicate which types of objects to obscure, such as all faces.

In some embodiments, system 102 may enable a user to indicate one or more preferences based on social criteria. For example, system 102 may enable the user to select particular people whose faces are to be obscured. Such selections may be based on people belonging to particular social groups such as family, friends, etc. The user may, for example, select an entire social group, where the user's preference is to have all faces of those people belonging to the social group obscured.

The one or more user preferences may include an indication of which objects to display unobscured. For example, the user may indicate which types of objects to be displayed unobscured, such as background objects, non-facial objects, etc.

In block 206, system 102 causes the one or more photos to be displayed such that the determined one or more objects in the photos are obscured. The following example embodiments describe how system 102 may obscure objects in a given photo.

Figure 4:
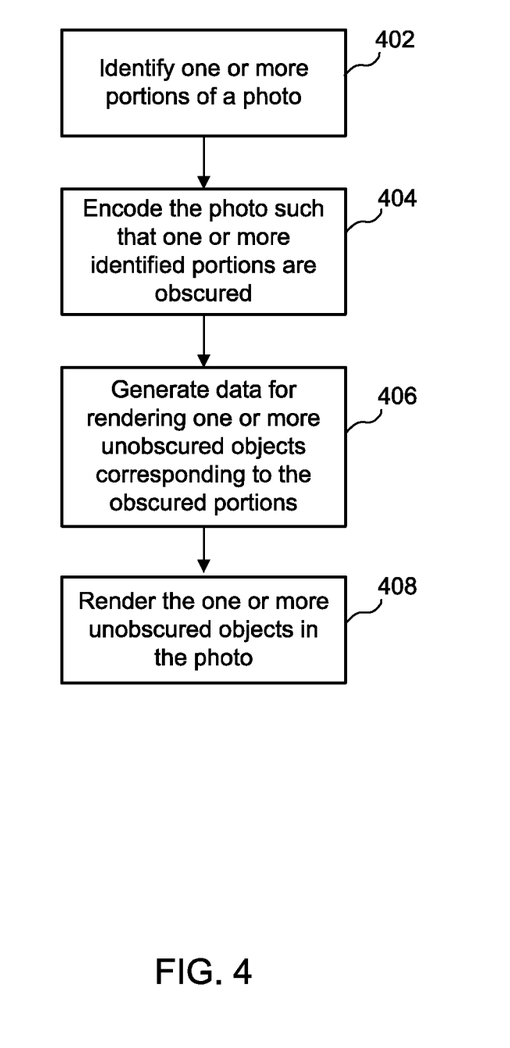
FIG. 4 illustrates an example simplified flow diagram for obscuring photos in a social network system, according to some embodiments.

FIG. 4 illustrates an example simplified flow diagram for obscuring photos in a social network system, according to some embodiments. A method is initiated in block 402, where system 102 identifies one or more portions of a given photo. In various embodiments, such portions correspond to objects that system 102 may obscure or may display unobscured. For ease of illustration, the example flow diagram of FIG. 4 is described in the context of one photo. In various embodiments, the example flow diagram of FIG. 4 also applies to multiple photos.

Figure 5:
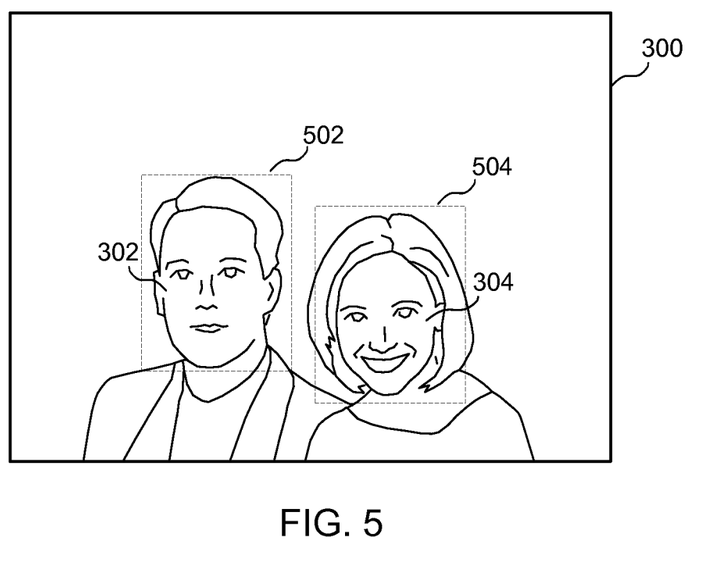
FIG. 5 illustrates an example simplified diagram of a photo, including identified portions of the photo, according to some embodiments.

FIG. 5 illustrates an example simplified diagram of photo 300, including identified portions 502 and 504 of photo 300, according to some embodiments. As shown, portions 502 and 504 correspond with respective faces 302 and 304 of the two people shown. In various embodiments, the portions may have different shapes and sizes depending on the particular implementation. For example, a given portion may have a shape and size that are based on the shape and size of a corresponding object. Such shapes may be, for example, circles, triangles, rectangles, etc., depending on the specific implementation. In some embodiments, shapes may follow the contour of objects. In the example shown in FIG. 5, portions 502 and 504 are rectangles. In various embodiments, system 102 adjusts the size of each portion in order to enclose the corresponding object. As shown, portions 502 and 504 have the same size and shape. In some embodiments, different portions may have different sizes and shapes.

FIG. 5 shows two portions 502 and 504, each framing a corresponding object (e.g., faces 302 and 304). In some embodiments, a single portion may frame two or more objects. For example, a single portion may frame both faces 302 and 304.

In block 404, system 102 encodes the photo such that one or more identified portions are obscured. In some embodiments, the identified portions to be obscured correspond to the objects and/or type of objects indicated by user preferences. For example, system 102 may obscure all faces. As such, by obscuring the identified portions in the photo, system 102 also obscures the corresponding objects contained or framed in those portions.

Figure 6:
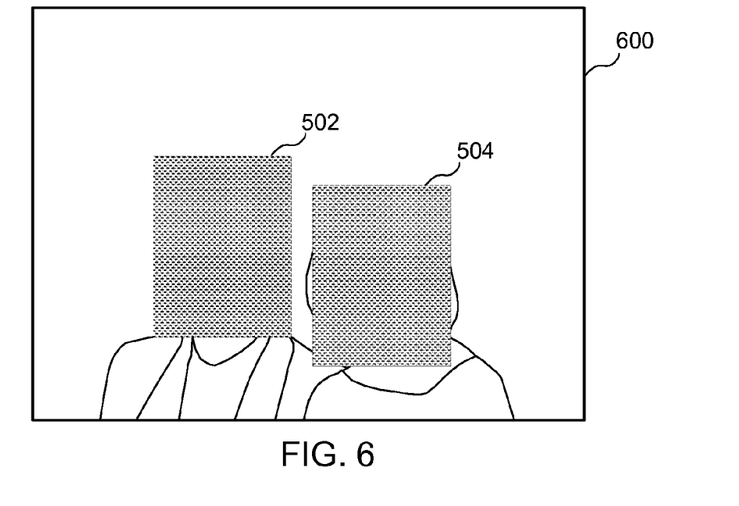
FIG. 6 illustrates an example simplified diagram of a photo, where identified portions of the photo are obscured, according to some embodiments.

FIG. 6 illustrates an example simplified diagram of a photo 600, where identified portions 502 and 504 of photo 600 are obscured, according to some embodiments.

In various embodiments, each portion may be locked or unlocked, where a locked portion is a portion of a photo that is to be obscured, and where an unlocked portion is a portion of a photo that is to be unobscured. Unlocked portions are described in more detail below in connection with FIG. 7.

With regard to locked portions, in some embodiments, system 102 obscures the locked portions such that any objects framed by the locked portions are obscured (e.g., blurred) beyond recognition. System 102 may leave the remaining portions of the photo unobscured. In various embodiments, system 102 enables access of the one or more photos with locked portions (obscured portions) to the public.

Such obscuring of objects such as faces enables privacy controls, which is beneficial to users as the Internet becomes less secure in terms of photos being shared by others outside of a user's control. Embodiments reduce privacy risks of photo sharing by obscuring information in photos that a person in the photo may not want public. Photos may leave a user's control when the photos are passed from one user to another, and so on. Other risks include photos being discovered by search engines, robots, hackers, etc.

Figure 7:
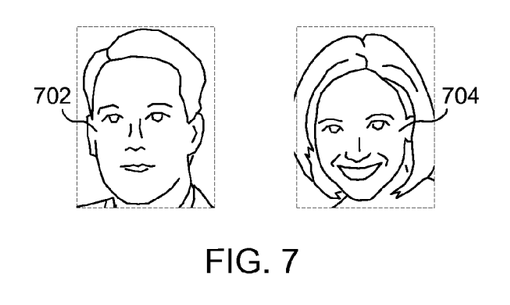
FIG. 7 illustrates an example simplified diagram of faces that are rendered from encoded data, according to some embodiments.

FIG. 7 illustrates an example simplified diagram of faces 702 and 704 that are rendered from encoded data, according to some embodiments. As shown in this example, faces 702 and 704 of FIG. 7 correspond to respective faces 302 and 304 and portions 502 and 504 of FIG. 5.

In block 406, system 102 generates data for rendering one or more unobscured objects corresponding to the obscured portions. In various embodiments, the data may be stored in any suitable location and made available for any person or group of people as permitted (e.g., according to user preference). In some embodiments, the data may be stored separately from the photo, and later combined with the photo when the appropriate portions are unlocked. As described in more detail below, in various embodiments, system 102 may use the data to render unobstructed objects corresponding to the obscured portion. In some embodiments, system 102 replaces an obscured portion with and unobscured portion.

Figure 8:
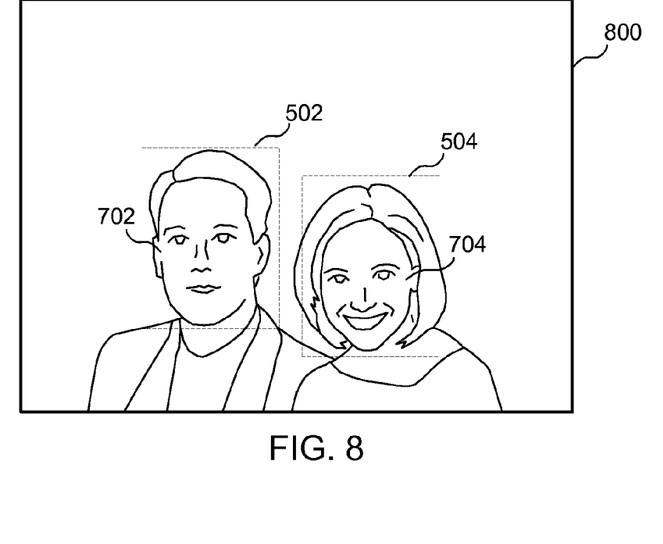
FIG. 8 illustrates an example simplified diagram of a photo that has unobstructed objects, according to some embodiments.

In block 408, system 102 renders the one or more unobscured objects in the photo. FIG. 8 illustrates an example simplified diagram of photo 800 that has unobstructed objects, according to some embodiments. As indicated above, in various embodiments, an unlocked portion is a portion of a photo that is to be unobscured. In some embodiments, if system 102 unlocks a given portion, system 102 renders the one or more unobscured objects in the unlocked portion. As shown, photo 800 shows the entire photo unobscured, as portions 502 and 504 are unobscured. In various embodiments, system 102 may allow access to a photo having unlocked portions to people (e.g., trusted people) who the user (owner of the photo) has granted access.

In some embodiments, one or more objects in the one or more photos are obscured by default, where one or more objects are selectively unobscured based on one or more user preferences. In some embodiments, system 102 may, by default, lock all portions except those that the user may designate as unlocked. For example, the user may designate that portions containing non-facial objects be unlocked.

In some embodiments, one or more objects in the at least one photo are unobscured by default, where one or more objects are selectively obscured based on one or more user preferences. In some embodiments, system 102 may by default unlock all portions except those that the user may designate as locked. For example, the user may designate that portions containing facial objects be locked.

In some embodiments, system 102 may obscure objects based on social factors. In other words, system 102 may lock or unlock portions of a photo based on social factors. For example, system 102 may permit any particular person or any person who is included in any one or more designated social groups (e.g., friends, family, etc.) to view the given photo unobstructed.

In some embodiments, system 102 may selectively obscure objects of the same type (e.g., faces). For example, system 102 may enable the user to designate that the face of any particular person or the face of any person who belong to any one or more particular social groups (e.g., friends, family, etc.) to be obscured in any photo.

In some embodiments, system 102 may provide an icon indicating that a given portion is locked (e.g., an icon of a lock, on or in the vicinity of the locked portion). In some embodiments, system 102 may enable a person who is not already permitted to view the photo with unlocked portions to request permission to view the photo entirely unlocked. System 102 may provide such a request to the owner of the photo, and, if granted, system 102 may then unlock the locked portions. As such, people who are not necessarily socially connected to the owner of the photo may view the photo entirely unlocked under certain circumstances such as in this example.

In some embodiments, system 102 may unlock portions of a given photo based on a particular location in which the photo is displayed. For example, system 102 may unlock portions of particular photos associated with (displayed in) particular websites or particular pages of one or more social network systems.

Although the steps, operations, or computations described herein may be presented in a specific order, the order may be changed in particular embodiments. Other orderings of the steps are possible, depending on the particular implementation. In some particular embodiments, multiple steps shown as sequential in this specification may be performed at the same time.

While system 102 is described as performing the steps as described in the embodiments herein, any suitable component or combination of components of system 102 or any suitable processor or processors associated with system 102 may perform the steps described.

In various embodiments, system 102 enables users of the social network system to specify and/or consent to the use of personal information, which may include system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In one embodiment, system 102 enables users of the social network to specify and/or consent to the use of using their photos for facial recognition in general. Example embodiments for recognizing faces and other objects are described in more detail below.

In various embodiments, system 102 obtains reference images of users of the social network system, where each reference image includes an image of a face that is associated with a known user. The user is known, in that system 102 has the user's identity information such as the user's name and other profile information. In one embodiment, a reference image may be, for example, a profile image that the user has uploaded. In one embodiment, a reference image may be based on a composite of a group of reference images.

In one embodiment, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example embodiments described herein. These embodiments may also apply to each face of multiple faces to be recognized.

In one embodiment, system 102 may search reference images in order to identify any one or more reference images that are similar to the face in the photo. In various embodiments, system 102 may use any suitable internal and/or external recognition algorithms to assist in face and object matching and/or recognition.

For ease of illustration, some example embodiments described above have been described in the context of a facial recognition algorithm. Other similar recognition algorithms and/or visual search systems may be used to recognize objects such as landmarks, logos, entities, events, etc. in order to implement embodiments described herein.

Embodiments described herein provide various benefits. For example, embodiments enable privacy controls for photos. Embodiments also reduce privacy risks of photo sharing by obscuring information in photos that a person in the photo may not want public.

Figure 9:
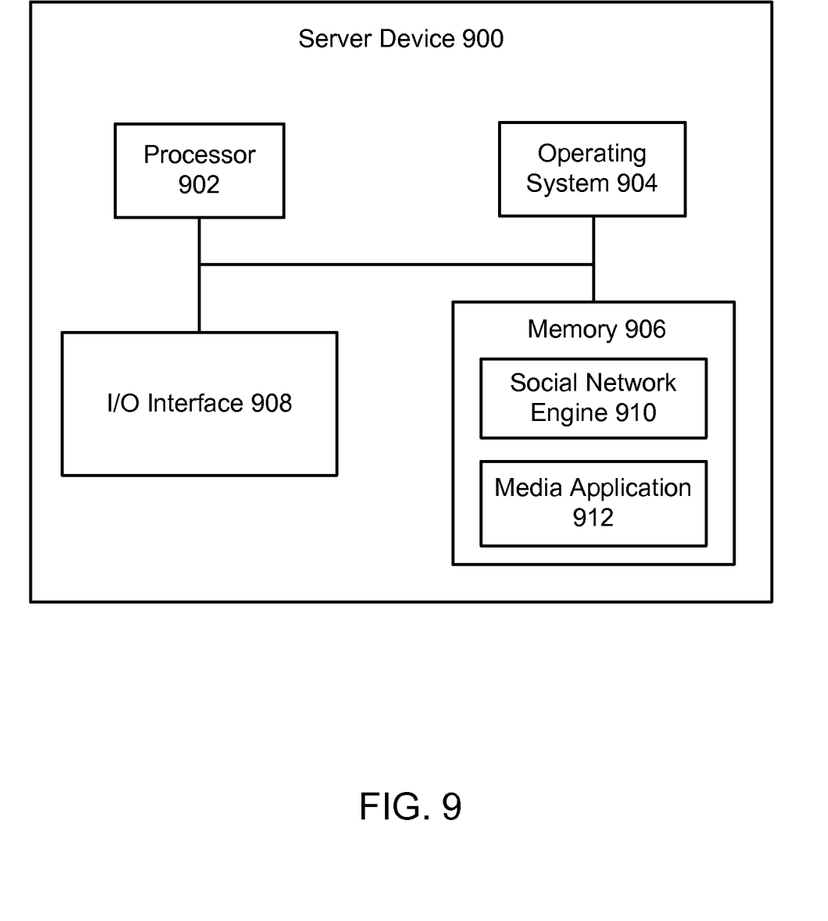
FIG. 9 illustrates a block diagram of an example server device, which may be used to implement the embodiments described herein.

FIG. 9 illustrates a block diagram of an example server device 900, which may be used to implement the embodiments described herein. For example, server device 900 may be used to implement server device 104 of FIG. 1, as well as to perform the method embodiments described herein. In some embodiments, server device 900 includes a processor 902, an operating system 904, a memory 906, and an input/output (I/O) interface 908. Server device 900 also includes a social network engine 910 and a media application 912, which may be stored in memory 906 or on any other suitable storage location or computer-readable medium. Media application 912 provides instructions that enable processor 902 to perform the functions described herein and other functions.

For ease of illustration, FIG. 9 shows one block for each of processor 902, operating system 904, memory 906, I/O interface 908, social network engine 910, and media application 912. These blocks 902, 904, 906, 908, 910, and 912 may represent multiple processors, operating systems, memories, I/O interfaces, social network engines, and media applications. In other embodiments, server device 900 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
   recognizing one or more objects in at least one photo, wherein the one or more objects include one or more of at least one face, text, and at least one logo, and wherein the recognizing is performed using one or more recognition algorithms;
   determining one or more objects to be obscured in the at least one photo based on one or more user preferences, wherein the one or more of the user preferences are based on one or more social criteria, wherein the determining of one or more objects to be obscured includes receiving one or more user preferences associated with the at least one photo, and wherein the one or more user preferences includes an indication of which objects to obscure; and
   causing the at least one photo to be displayed such that the determined one or more objects are obscured, wherein one or more objects in the at least one photo are obscured by default, and wherein one or more objects are selectively unobscured based on one or more user preferences.

2. A method comprising:
   recognizing one or more objects in at least one photo;
   determining one or more objects to be obscured in the at least one photo based on one or more user preferences, wherein the one or more of the user preferences are based on one or more social criteria; and
   causing the at least one photo to be displayed such that the determined one or more objects are obscured.

3. The method of claim 2, wherein one or more of the social criteria are based on one or more social groups.

4. The method of claim 2, wherein at least one object of the one or more objects includes text.

5. The method of claim 2, wherein at least one object of the one or more objects includes a logo.

6. The method of claim 2, wherein one or more of the user preferences are based on one or more types of objects.

7. The method of claim 2, wherein the one or more user preferences includes an indication of which objects to obscure.

8. The method of claim 2, wherein the determining of one or more objects to be obscured includes receiving one or more user preferences associated with the at least one photo, and wherein the one or more user preferences includes an indication of which objects to obscure.

9. The method of claim 2, wherein the one or more user preferences includes an indication of which objects to display unobscured.

10. The method of claim 2, wherein one or more objects in the at least one photo are obscured by default, and wherein one or more objects are selectively unobscured based on one or more user preferences.

11. The method of claim 2, wherein one or more objects in the at least one photo are unobscured by default, and wherein one or more objects are selectively obscured based on one or more user preferences.

12. A system comprising:
one or more processors; and
logic encoded in one or more tangible media for execution by the one or more processors and when executed operable to perform operations comprising:
recognizing one or more objects in at least one photo;
determining one or more objects to be obscured in the at least one photo based on one or more user preferences, wherein the one or more of the user preferences are based on one or more social criteria; and
causing the at least one photo to be displayed such that the determined one or more objects are obscured.

13. The system of claim 12, wherein at least one object of the one or more objects is a face.

14. The system of claim 12, wherein at least one object of the one or more objects includes text.

15. The system of claim 12, wherein at least one object of the one or more objects includes a logo.

16. The system of claim 12, wherein the recognizing is performed using one or more recognition algorithms.

17. The system of claim 12, wherein the one or more user preferences includes an indication of which objects to obscure.

18. The system of claim 12, wherein to determine one or more objects to be obscured, the logic when executed is further operable to perform operations comprising receiving one or more user preferences associated with the at least one photo, and wherein the one or more user preferences includes an indication of which objects to obscure.

19. The system of claim 12, wherein the one or more user preferences includes an indication of which objects to display unobscured.

20. The system of claim 12, wherein one or more objects in the at least one photo are obscured by default, and wherein one or more objects are selectively unobscured based on one or more user preferences.

* * * * *